United States Patent
Pereira et al.

(10) Patent No.: US 12,210,772 B2
(45) Date of Patent: Jan. 28, 2025

(54) METHOD AND A HOST DEVICE FOR ACCESSING DATA FROM A DATA STORAGE DEVICE

(71) Applicant: SAMSUNG ELECTRONICS CO., LTD., Suwon-si (KR)

(72) Inventors: Rowen Alphonso Pereira, Karnata (IN); Deepak Kumar Pattnaik, Karnataka (IN); Kumar Abhinav, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/363,215

(22) Filed: Aug. 1, 2023

(65) Prior Publication Data

US 2024/0402939 A1 Dec. 5, 2024

(30) Foreign Application Priority Data

May 31, 2023 (IN) .............................. 202341037446

(51) Int. Cl.
*G06F 3/06* (2006.01)
(52) U.S. Cl.
CPC .......... *G06F 3/0656* (2013.01); *G06F 3/0604* (2013.01); *G06F 3/064* (2013.01); *G06F 3/0673* (2013.01)
(58) Field of Classification Search
CPC ...... G06F 3/0656; G06F 3/0604; G06F 3/064; G06F 3/0673
See application file for complete search history.

(56) References Cited

U.S. PATENT DOCUMENTS

| | | | |
|---|---|---|---|
| 9,563,367 B2 | 2/2017 | Chu et al. | |
| 10,409,511 B1* | 9/2019 | Subbarao | G06F 3/0607 |
| 2019/0034364 A1* | 1/2019 | Lee | G06F 13/1673 |
| 2021/0357148 A1* | 11/2021 | Sela | G06F 3/0653 |
| 2021/0382653 A1* | 12/2021 | Muthiah | G06F 3/0604 |
| 2022/0035564 A1 | 2/2022 | Singh et al. | |
| 2022/0050770 A1* | 2/2022 | Das Purkayastha | G06F 12/0238 |
| 2022/0100418 A1 | 3/2022 | Benisty et al. | |

* cited by examiner

*Primary Examiner* — Prasith Thammavong
(74) *Attorney, Agent, or Firm* — F. Chau & Associates, LLC (57) ABSTRACT

A method of accessing data from a data storage device includes transmitting a request including a first part to the data storage device, based on availability of memory in host device. The first part includes data access information and one or more parameters for accessing data from data storage device. The method further includes receiving a first notification from the data storage device, indicating a transfer of the data to a storage buffer associated with the data storage device. The method further includes accessing the data from the data storage device by transmitting second part of request to the data storage device. The second part includes buffer information associated with a host buffer of host device. The data is transferred by the data storage device from the storage buffer to the host buffer of host device using buffer information.

20 Claims, 6 Drawing Sheets

METHOD AND A HOST DEVICE FOR ACCESSING DATA FROM A DATA STORAGE DEVICE

CROSS-REFERENCE TO RELATED APPLICATIONS

This application claims priority under 35 U.S.C. § 119 to Indian patent application No. 202341037446 filed on May 31, 2023, the disclosure of which is incorporated by reference herein in its entirety.

TECHNICAL FIELD

Embodiments of the present disclosure relate to data storage devices. More particularly, embodiments of the present disclosure relate to a method and a host device for accessing data from a data storage device.

DISCUSSION OF RELATED ART

Data storage devices store data and instructions to be processed in a computer system or a host device. The data storage devices may include, for example, a solid state drive (SSD), a hard disk drive (HDD), and the like. The host device accesses a data storage device for performing, for example, a read operation, a write operation, and the like, on the data stored in the data storage device. The host device performs the read operation by transmitting an input/output (I/O) command (also referred to as a read command) to the data storage device.

Generally, the read command includes two parts, e.g., a description of the read command and buffer information of a host buffer in the host device. The description of the read command includes, for example, a source of the read, a characteristic of the read, and the like. A processor in the host device uses information in the read command for requesting the data from the data storage device.

SUMMARY

In an embodiment of the present disclosure, a method of accessing data from a data storage device includes transmitting, by a host device, a request including a first part to the data storage device, based on an availability of memory in the host device. The first part includes data access information and one or more parameters for accessing data corresponding to the request from the data storage device. The method further includes receiving, by the host device, a first notification from the data storage device, indicating a transfer of the data to a storage buffer associated with the data storage device. The method further includes accessing, by the host device, the data from the data storage device by transmitting a second part of the request to the data storage device. The second part includes buffer information associated with a host buffer of the host device. The data is transferred by the data storage device from the storage buffer to the host buffer of the host device using the buffer information.

In an embodiment of the present disclosure, a host device for accessing data from a data storage device includes one or more processors and a memory storing processor-executable instructions, which, on execution, cause the one or more processors to transmit a request including a first part to the data storage device, based on an availability of memory in the host device. The first part includes data access information and one or more parameters for accessing data corresponding to the request from the data storage device. The one or more processors are further configured to receive a first notification from the data storage device, indicating a transfer of the data to a storage buffer associated with the data storage device. The one or more processors are further configured to access the data from the data storage device by transmitting a second part of the request to the data storage device. The second part includes buffer information associated with a host buffer of the host device. The data is transferred by the data storage device from the storage buffer to the host buffer of the host device using the buffer information.

BRIEF DESCRIPTION OF THE DRAWINGS

The above and other features of the present invention will become more apparent by describing in detail embodiments thereof with reference to the accompanying drawings, in which.

It should be appreciated by those skilled in the art that any block diagram herein represents conceptual views of illustrative systems embodying the principles of embodiments of the present application. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

Embodiments of the present disclosure will be described more fully hereinafter with reference to the accompanying drawings. Like reference numerals may refer to like elements throughout the accompanying drawings.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", "includes", "including" or any other variations thereof, are intended to cover a non-exclusive inclusion, such that a setup, device or method that comprises a list of components or operations does not include only those components or operations but may include other components or operations not expressly listed or inherent to such setup, device or method. In other words, one or more elements in a system or apparatus proceeded by "comprises . . . a" does not, without more constraints, preclude the existence of other elements or additional elements in the system or apparatus.

Data storage devices store data and instructions to be processed in a computer system or a host device. The host device accesses a data storage device for performing, for example, a read operation, a write operation, and the like, on the data stored in the data storage device. The host device performs the read operation by transmitting an input/output (I/O) command (also referred as a read command) to the data storage device. The read command includes a description of the read command and buffer information of a host buffer in the host device. In memory constrained host systems, the host device may include a limited buffer to issue the read command. In such a case, situations occur in which the host device cannot issue the I/O command to the data storage device or cannot issue I/O commands sufficient to use the capability of the data storage device.

Embodiments of the present disclosure disclose a method and a host device for accessing data from a data storage device. According to embodiments of the present disclosure, the host device transmits a request for reading the data from the data storage device in two parts, when there is a memory constraint in the host device. A first part of the request includes data access information and parameters for accessing the data from the data storage device. A second part includes the buffer information. This ensures that a smaller amount of information (e.g., in some cases, minimal information) that is used to load the data at the data storage device is transmitted initially to the data storage device. According to embodiments, the host device transmits the second part only after the data is ready to be transmitted at the data storage device. This enables the host device to free its buffer until the data is ready to be transmitted at the data storage device. Further, embodiments of the present disclosure enable issuing of the request when limited buffer is available at the host device. Also, as the host device transmits the first part of the request only, the host device can transmit multiple I/O commands sufficient to use the capability of the data storage device.

Figure 1:
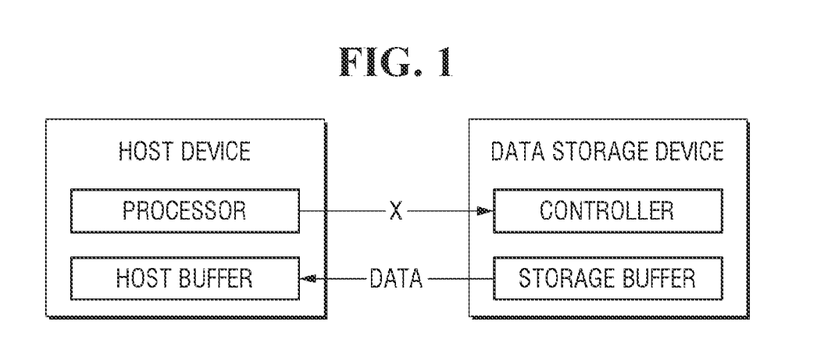
FIG. 1 illustrates a method of accessing data from a data storage device according to a comparative example.

FIG. 1 illustrates a method of accessing the data from the data storage device according to a comparative example. The host device transmits the read command 'X' to the data storage device. The data is transferred from a storage buffer of the data storage device to the host buffer, upon receiving the read command from the host device.

According to the comparative example, the buffer information is not used by the data storage device until the data is ready to be transmitted in the data storage device. However, the host device prepares the location of the host buffer before issue of the read command. When the host device is out of buffer, the I/O command is not issued to the data storage device. For example, the host device may include a limited buffer to issue the read command in memory constrained host systems. In such a case, the host device cannot issue the I/O command to the data storage device or cannot issue I/O commands sufficient to use a capability of the data storage device. For example, the host device may include a memory of 512K. Consider an example in which the size of the I/O command is 128K. In such a case, the host device can issue a maximum of four I/O commands to the data storage device. Due to lack of memory availability in the host device, the host device cannot issue more than four I/O commands. Thus, in the comparative example, the capability of the data storage device is not used optimally due to lack of I/O commands issued by the host device.

Figure 2:
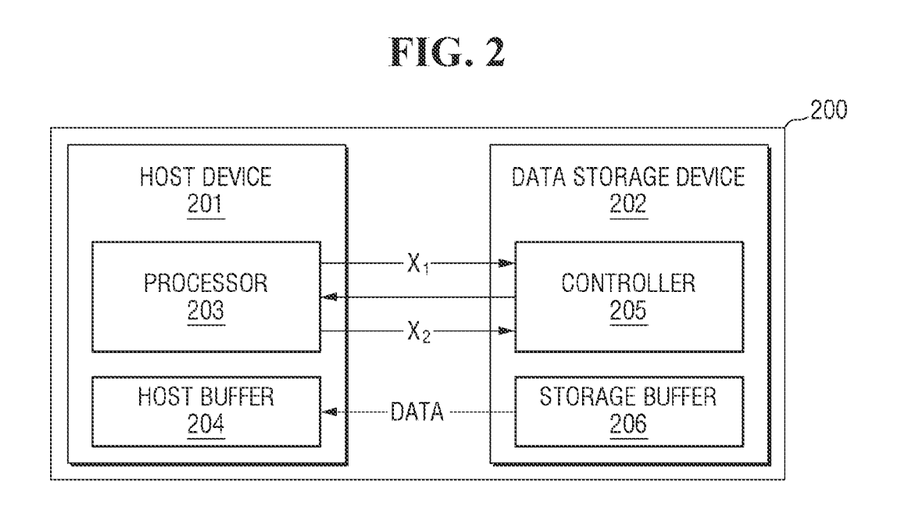
FIG. 2 illustrates an exemplary environment for accessing data from the data storage device, in accordance with some embodiments of the present disclosure.

FIG. 2 illustrates an exemplary environment 200 for accessing data from a data storage device. The exemplary environment 200 includes a host device 201 and a data storage device 202. The host device 201 may be any computing device that communicates with other host devices on a network. The host device 201 may include, for example, a laptop computer, a desktop computer, a personal computer (PC), a notebook, a smartphone, a tablet, an e-book reader, a server, a network server, a cloud-based server, and the like. The data storage device 202 stores data and instructions to be processed in the host device 201. The data storage device 202 may include, for example, a solid state drive (SSD), a hard disk drive (HDD), and the like, as well as any other similar data storage devices.

The host device 201 may include a processor 203 and a memory. The functionality of the processor 203 is described in detail below. The memory includes a host buffer 204 that loads data from the data storage device 202. The data storage device 202 may include a controller 205 and a memory. The controller 205 is an electronic component of the data storage device 202 that acts as a bridge between the memory of the data storage device 202 and the host device 201. The controller 205 may be an embedded processor that performs functions such as, for example, read and write, caching, error detection and correction, and the like. The memory of the data storage device 202 stores the data of the host device 201. In an embodiment, the memory may include a volatile memory such as, for example, dynamic random access memory (DRAM), cache, and the like. In an embodiment, the memory may include a non-volatile memory such as, for example, NAND flash memory. Any other memory types may be used in the data storage device 202. The host device 201 and the data storage device 202 may be connected via an interface. The interface may include an internal interface or an external interface. The interface may be implemented by using various interface schemes such as, for example, an advanced technology attachment (ATA) interface, a serial ATA (SATA) interface, an external SATA (e-SATA) interface, a small computer system (SCSI) interface, a serial attached SCSI (SAS) interface, a peripheral component interconnection (PCI) interface, a PCI express (PCIe) interface, an NVMe interface, an IEEE 1394 interface, a universal serial bus (USB) interface, a secure digital (SD) card interface, a multimedia card (MMC) interface, an eMMC interface, a universal flash storage (UFS) interface, an embedded UFS (eUFS) interface, and a compact flash (CF) card interface.

The host device 201 may be configured to access the data from the data storage device 202. In embodiments of the present disclosure, the host device 201 transmits a request for accessing the data from the data storage device 202 in two parts when sufficient memory is not available to transmit the request. Firstly, the host device 201 transmits a request including a first part ($X_1$) to the data storage device 202 for accessing the data from the data storage device 202. In embodiments of the present disclosure, the request is a read request for reading the data from the data storage device 202. The first part of the request includes data access information and one or more parameters for accessing the data. The data access information may include one or more start logical block addresses (LBAs) indicating the location of the data in the data storage device 202. The one or more parameters may include, for example, a number of logical blocks (NLB) of the data, error recovery information, security information, and a type of access to the data storage device 202. The first part of the request includes information that is used to load the data from a physical memory of the data storage device 202 to a storage buffer 206 of the data storage device 202.

The host device 201 receives a notification from the data storage device 202 once the data is loaded to the storage buffer 206. The transfer of the data to the storage buffer 206 is performed by the controller 205 associated with the data storage device 202. The controller 205 may identify locations in a physical memory of the data storage device 202 by referring to look up tables based on the data access information and the one or more parameters. The look up tables include a mapping of logical block address included in the request with the physical memory of the data storage device 202. The controller 205 may issue commands (for example, NAND commands) to access the data from the physical memory and load the data to the storage buffer 206. The storage buffer 206 may include, for example, an internal buffer and a page buffer associated with the data storage device 202. Once the controller 205 loads the data to the storage buffer 206, the host device 201 receives the first notification from the data storage device 202.

Then, the host device 201 transmits the request including a second part ($X_2$) to the data storage device 202. The second part includes buffer information associated with the host buffer 204 of the host device 201. For example, the buffer information includes a list of entries in the host buffer 204 or one or more pointers to the list of entries in the data storage device 202. The data storage device 202 transfers the data from the storage buffer 206 to the host buffer 204, using the buffer information.

Figure 3:
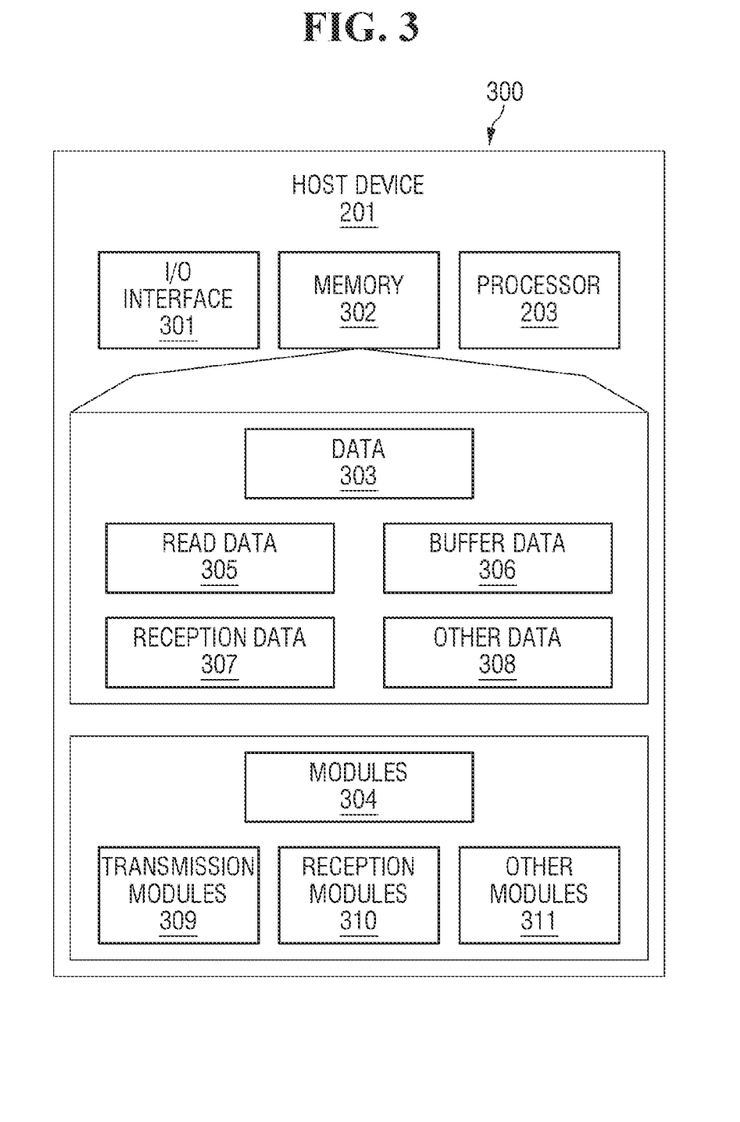
FIG. 3 illustrates a detailed diagram of a host device for accessing data from the data storage device, in accordance with some embodiments of the present disclosure.

FIG. 3 illustrates a detailed diagram 300 of the host device 201 for accessing the data from the data storage device 202, in accordance with some embodiments of the present disclosure.

The host device 201 may include central processing units 203 (also referred as "CPUs" or "the processor 203"), an input/output (I/O) interface 301, and a memory 302. In some embodiments, the memory 302 may be communicatively coupled to the processor 203. The memory 302 stores instructions executable by the processor 203. The processor 203 may include at least one data processor that executes program components for executing user or system-generated requests. The memory 302 may be communicatively coupled to the processor 203. The memory 302 stores instructions executable by the processor 203, which, on execution, may cause the processor 203 to access the data from the data storage device 202. In an embodiment, the memory 302 may include one or more modules 304 and data 303. The one or more modules 304 may be configured to perform the operations of embodiments of the present disclosure using the data 303, to access the data from the data storage device 202. In an embodiment, each of the one or more modules 304 may be a hardware unit which may be disposed outside of the memory 302 and coupled with the host device 201. As used herein, the term modules 304 may refer to an application specific integrated circuit (ASIC), an electronic circuit, a field-programmable gate array (FPGA), a programmable system-on-chip (PSoC), a combinational logic circuit, and/or other suitable components that provide described functionality. The one or more modules 304 when configured with the described functionality defined in embodiments of the present disclosure may result in a novel hardware. Further, the I/O interface 301 is coupled with the processor 203 through which an input signal and/or an output signal is communicated. For example, the host device 201 may transmit the request to the data storage device 202 via the I/O interface 301. The I/O interface 301 may include an internal interface or an external interface.

In an embodiment, the modules 304 may include, for example, a transmission module 309, a reception module 310, and other modules 311. It will be appreciated that such aforementioned modules 304 may be represented as a single module or a combination of different modules. In one implementation, the data 303 may include, for example, read data 305, buffer data 306, reception data 307, and other data 308.

In an embodiment, the transmission module 309 may be configured to transmit the request to the data storage device 202, for accessing the data stored in the data storage device 202. The transmission module 309 may determine an availability of memory in the host device 201. The transmission module 309 may transmit the request in two parts when the available memory in the host device 201 is less than the amount of memory used to transmit the request. For example, the available memory may be 64K, and the amount of memory used to transmit the request may be 128K. The transmission module 309 may transmit the request including the first part to the data storage device 202. The first part may include data access information and one or more parameters for accessing the data from the data storage device 202. The data access information may include one or more start logical block addresses (LBAs) indicating the location of the data in the data storage device 202. In an implementation, the one or more start LBAs may indicate a 64-bit address of a first logical block to be read corresponding to the request. The one or more parameters may include, for example, a number of logical blocks (NLB) of the data, error recovery information, security information, and a type of access to the data storage device 202. In an embodiment, the error recovery information may include information related to limited retry (LR), the security information may include protection information (PRINFO), and the type of access to the data storage device 202 may include force unit access (FUA) information.

Figure 4:
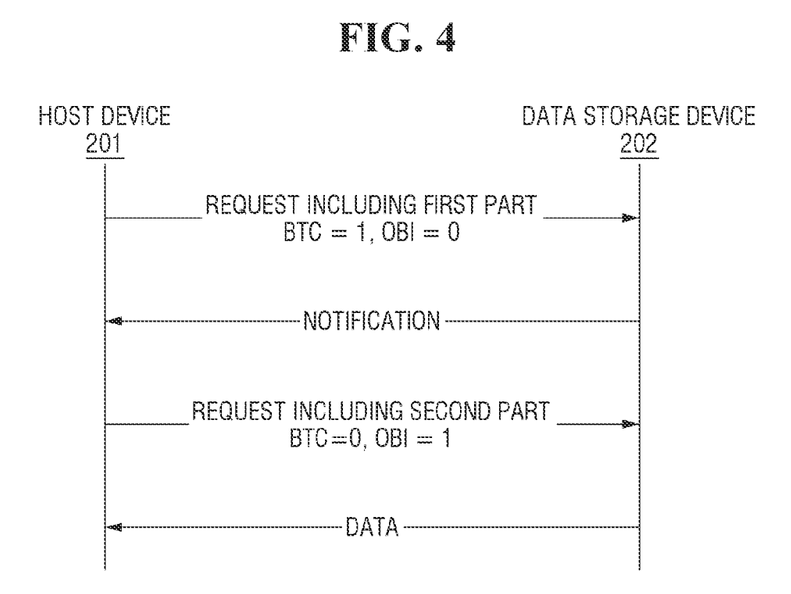
FIG. 4 illustrates a sequence diagram for accessing data from the data storage device, in accordance with some embodiments of the present disclosure.

The first part of the request may further include a field indicating inclusion of the buffer information in the second part. The field is used to indicate that the request is transmitted in two parts. The field is also referred as buffer transfer characteristics (BTC). In an example, the BTC may include a value of '1' to indicate that the request is transmitted in two parts. Further, the first part may also include field only buffer information (OBI) whose value is '0' when transmitting the first part. Referring to a sequence diagram 400 illustrated in FIG. 4, the host device 201 transmits the request including the first part with BTC='1' and OBI='0'. Referring back to FIG. 3, in an embodiment, the request may include the first part with only one start LBA. In such a case, the data storage device 202 may load the data associated with the start LBA in the storage buffer 206. In an embodiment, the request may include the first part with multiple start LBAs. In such a case, the data storage device 202 may load the data associated with the start LBA in the storage buffer 206. In an example, consider the available memory is 64K and the memory used to transmit the request is 128K.

The host device 201 may transmit the request including only the first part to the data storage device 202, as the memory used to transmit the request is less than the available memory. Consider, for example, the memory used to transmit four requests with the first part is 128K. In such a case, the host device 201 may transmit four requests including only the first part to the data storage device 202. In an embodiment, the request may be command specific to a vendor. The command may include a first sub-command and a second sub-command used to transmit the first part and the second part of the request. For example, in an embodiment, the first sub-command may be used to transmit the first part of the request, and the second sub-command may be used to transmit the second part of the request. In an embodiment, the command specific to the vendor may be used to transmit the first part, and the read command may be used to transmit the second part. In an embodiment, the read command may be used to transmit the first part and the command specific to the vendor may be used to transmit the second part. The request including the first part may be stored as the read data 305 in the memory 302.

In an embodiment, the reception module 310 may be configured to receive a first notification from the data storage device 202. The first notification indicates a transfer of the data to the storage buffer 206 associated with the data storage device 202. Referring again to FIG. 4, the reception module 310 may receive the notification from the data storage device 202 upon the transferring of data to the storage buffer 206. Referring back to FIG. 3, the notification may be stored as the reception data 307 in the memory 302.

In an embodiment, the transmission module 309 may be further configured to receive the reception data 307 from the reception module 310. Further, the transmission module 309 may be configured to transmit the second part of the request to the data storage device 202. The second part of the request may include buffer information associated with the host buffer 204 of the host device 201. In an embodiment, the second part of the request further includes a field indicating an identifier associated with the request. For example, the first part of the request may include an identifier '001'. The second part of the request may include the field with the identifier '001' to indicate to the data storage device 202 that the first part and the second part belong to the request.

Figure 5:
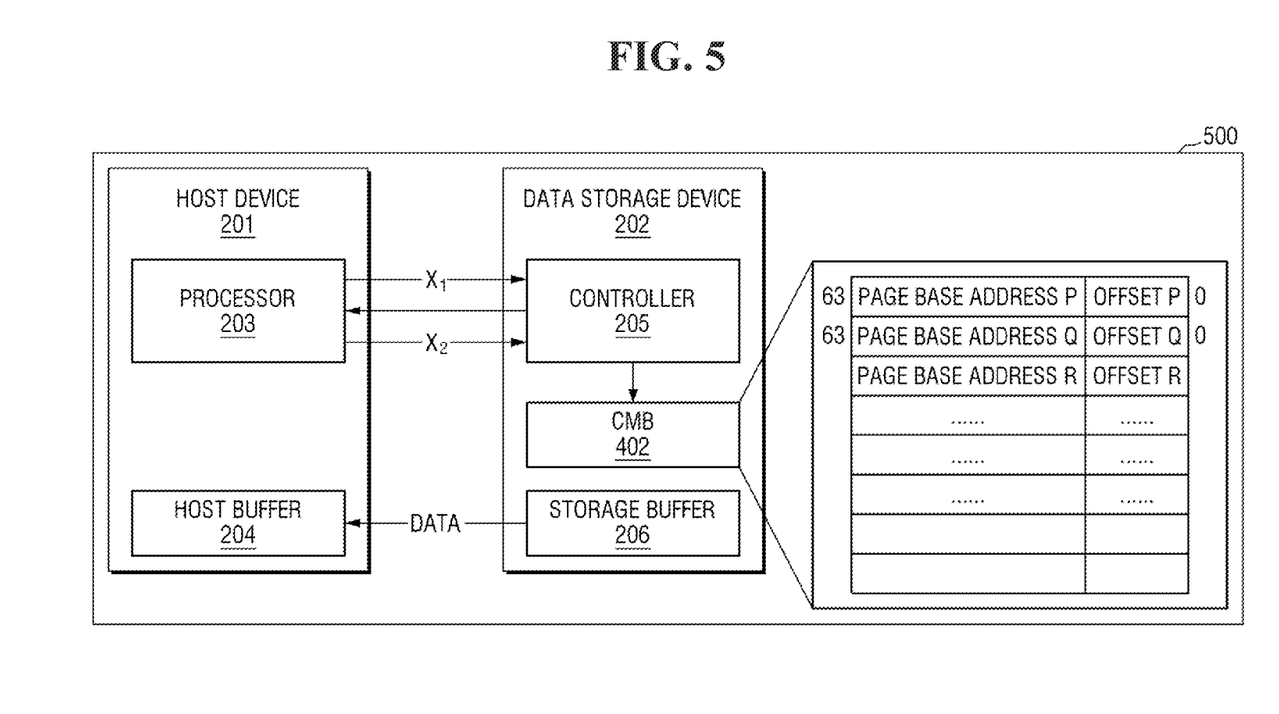
FIG. 5 illustrates an exemplary illustration for accessing data from the data storage device, in accordance with some embodiments of the present disclosure.

In an embodiment, the buffer information may include a list of entries in the host buffer 204. The list of entries may include locations in the host buffer 204 for transferring data from the data storage device 202. The list of entries may be, for example, physical region page (PRP) entries, scatter gather list (SGL) entries, and the like. In an embodiment, the list of entries may be stored in a controller memory buffer (CMB) 402 associated with the controller 205 of the data storage device 202 as illustrated in FIG. 5. The CMB 402 is a memory space on the data storage device 202 which can be directly read and written by the host device 201. In such a case, the buffer information may include one or more pointers to the list of entries in the CMB 402. The transmission module 309 transmits the buffer information including the one or more pointers for transferring the data from the storage buffer 206 to the host buffer 204 of the host device 201. The BTC may include a value of '0' when transmitting the request including the second part. Further, the OBI may include a value of '1' when transmitting the second part, as the buffer information is transmitted in the second part. Referring again to FIG. 4, the transmission module 309 may transmit the request including the second part with BTC='0' and OBI='1'. The data may be accessed upon transfer of the data from the storage buffer 206 to the host buffer 204.

Referring back to FIG. 3, in an embodiment, the transmission module 309 may transmit the request including the first part to the data storage device 202. Further, the transmission module 309 may transmit one or more subsequent requests including the first part, thereby sending a plurality of requests including the first part to the data storage device 202. However, transmission of the second part may be pending at the host device 201. In an embodiment, the transmission module 309 may receive a second notification from the data storage device 202 indicating pendency of transmission of the second part. The data storage device 202 may transmit the second notification for various reasons. For example, the data storage device 202 may be idle and may have processing capabilities to process the requests. For example, consider that the transmission module 309 transmits two requests including the first part to the data storage device 202. However, transmission of the second part for the two requests may be pending at the host device 201. The data storage device 202 may have the processing capability to process two requests. In such a case, the transmission module 309 may receive the second notification from the data storage device 202 that the second part is pending for the two requests. Further, the transmission module 309 may receive such second notifications when three requests are pending, four requests are pending, and so on. In an example, the transmission module 309 may receive the second notification when two requests are pending. Further, in an embodiment, the transmission module 309 may not receive the second notification when three requests are pending, as the storage buffer 206 may not be ready.

The transmission module 309 may receive the second notification when four requests are pending. In an embodiment, the transmission module 309 may transmit a third notification, when a number of the plurality of requests including the first part reaches a maximum pre-defined limit. A maximum pre-defined limit may be set at the data storage device 202. For example, the transmission module 309 may transmit four requests including the first part to the data storage device 202. The maximum pre-defined limit may be four. Accordingly, the transmission module 309 may receive the third notification from the data storage device 202 to transmit the second part for the plurality of requests. The transmission module 309 may transmit the second part for the plurality of requests, upon receiving the second notification. Further, the transmission module 309 may transmit at least one subsequent request to the data storage device 202 upon transmission of the second part, when the number of the plurality of requests including the first part reaches the maximum pre-defined limit. In an embodiment, the transmission module 309 may transmit a reset request to the data storage device 202 when the host device 201 is unable to transmit the second part of the request. The transmission module 309 may transmit the reset request for clearing states/resources maintained for the request at the data storage device 202.

The other data 308 may store data, including temporary data and temporary files, generated by the one or more modules 304 for performing the various functions of the host device 201. The one or more modules 304 may also include the other modules 311 to perform various miscellaneous functionalities of the host device 201. The other data 308 may be stored in the memory 302. It will be appreciated that the one or more modules 304 may be represented as a single module or a combination of different modules.

Figure 6:
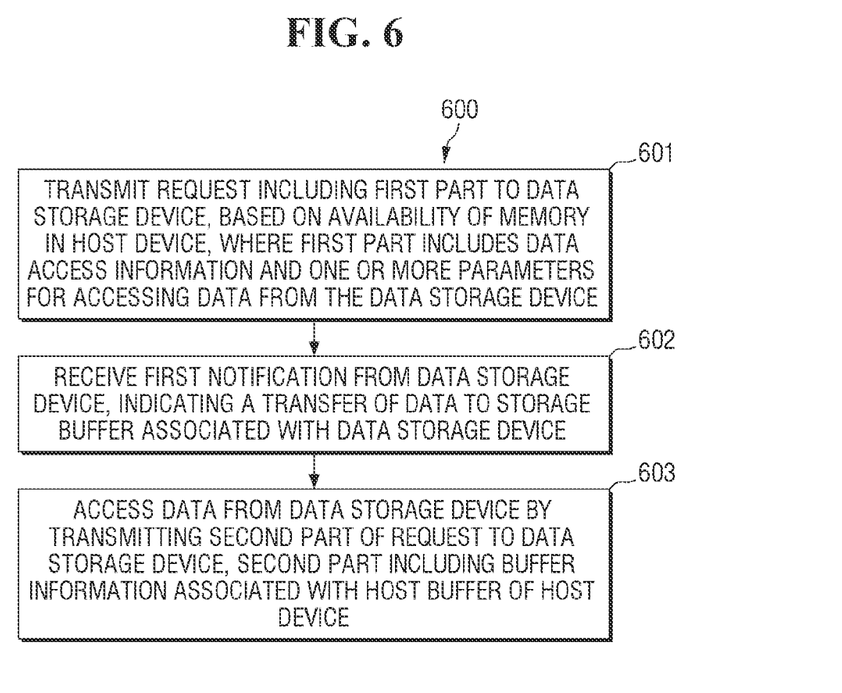
FIG. 6 shows an exemplary flow chart illustrating method operations for accessing data from the data storage device, in accordance with some embodiments of the present disclosure.

FIG. 6 shows an exemplary flow chart illustrating method operations for accessing the data from the data storage device 202, in accordance with some embodiments of the present disclosure.

As illustrated in FIG. 6, the method 600 may include one or more operations. The method 600 may be described in the general context of computer executable instructions. Generally, computer executable instructions can include, for example, routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 601, the host device 201 transmits the request including the first part to the data storage device 202 for accessing the data, based on an availability of memory in the host device 201. The first part may include data access information and one or more parameters for accessing the data from the data storage device 202. The data access information may include one or more start logical block addresses (LBAs) indicating the location of the data in the data storage device 202. The first part of the request may further include a field indicating inclusion of the buffer information in the second part.

At operation 602, the host device 201 receives the first notification from the data storage device 202. The first notification indicates a transfer of the data to the storage buffer 206 associated with the data storage device 202. The controller 205 may identify locations in physical memory of the data storage device 202 and load the data to the storage buffer 206. The storage buffer 206 may include, for example, an internal buffer and a page buffer associated with the data storage device 202.

At operation 603, the host device 201 transmits the second part of the request to the data storage device 202. The second part of the request may include buffer information associated with the host buffer 204 of the host device 201. In an embodiment, the second part of the request further includes a field indicating an identifier associated with the request. In an embodiment, the buffer information may include a list of entries in the host buffer 204. The list of entries may include locations in the host buffer 204 for transferring data from the data storage device 202. In an embodiment, the list of entries may be stored in the CMB 402 associated with the controller 205 of the data storage device 202.

Figure 7:
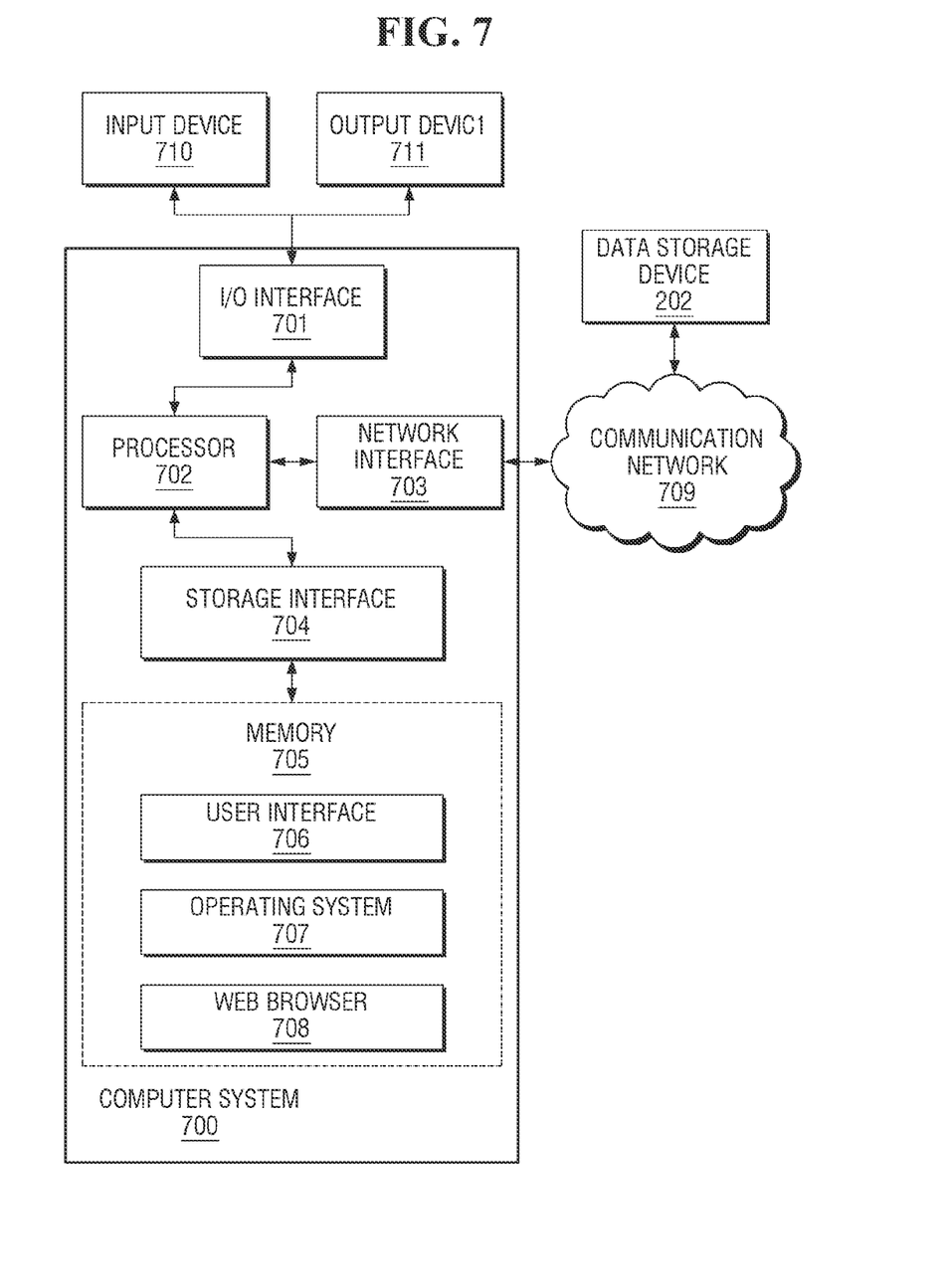
FIG. 7 shows a block diagram of a general-purpose computing system for accessing data from the data storage device, in accordance with some embodiments of the present disclosure.

FIG. 7 illustrates a block diagram of an exemplary computer system 700 for implementing embodiments of the present disclosure.

In an embodiment, the computer system 700 may be the host device 201. Thus, the computer system 700 may be used to access the data from the data storage device 202. The computer system 700 and the data storage device 202 may be connected via an interface. The interface may include an internal interface or an external interface. Further, the interface may include a wireless interface. In such a case, the host device 201 may communicate with the data storage device 202 over a communication network 709. The computer system 700 may include a central processing unit 702 (also referred as a "CPU" or a "processor"). The processor 702 may include at least one data processor. The processor 702 may include specialized processing units such as, for example, integrated system (bus) controllers, memory management control units, floating point units, graphics processing units, digital signal processing units, etc.

The processor 702 may be in communication with one or more input/output (I/O) devices via an I/O interface 701. The I/O interface 701 may employ communication protocols/methods such as, for example, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be, for example, a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

The processor 702 may be disposed in communication with the communication network 709 via a network interface 703. The network interface 703 may communicate with the communication network 709. The network interface 703 may employ connection protocols including, for example, direct connect, Ethernet (e.g., twisted pair 10/100/1000 Base T), transmission control protocol/internet protocol (TCP/IP), token ring, IEEE 802.11a/b/g/n/x, etc. The communication network 709 may include, for example, a direct interconnection, local area network (LAN), wide area network (WAN), wireless network (e.g., using wireless application protocol), the Internet, etc. The network interface 703 may employ connection protocols including, for example, direct connect, Ethernet (e.g., twisted pair 10/100/1000 Base T), transmission control protocol/Internet protocol (TCP/IP), token ring, IEEE 802.11a/b/g/n/x, etc.

The communication network 709 includes, for example, a direct interconnection, an e-commerce network, a peer to peer (P2P) network, local area network (LAN), wide area network (WAN), wireless network (e.g., using wireless application protocol), the Internet, Wi-Fi, etc. The first network and the second network may either be a dedicated network or a shared network, which represents an association of the different types of networks that use a variety of protocols, for example, hypertext transfer protocol (HTTP), transmission control protocol/Internet protocol (TCP/IP), wireless application protocol (WAP), etc., to communicate with each other. Further, the first network and the second network may include a variety of network devices, including, for example, routers, bridges, servers, computing devices, storage devices, etc.

In some embodiments, the processor 702 may be in communication with a memory 705 (e.g., RAM, ROM, etc.) via a storage interface 704. The storage interface 704 may connect to the memory 705 including, for example, memory drives, removable disc drives, etc., employing connection protocols such as, for example, serial advanced technology attachment (SATA), integrated drive electronics (IDE), IEEE-1394, universal serial bus (USB), fiber channel, small computer systems interface (SCSI), etc. The memory drives may further include, for example, a drum, magnetic disc drive, magneto-optical drive, optical drive, redundant array of independent disks (RAID), solid-state memory devices, solid-state drives, etc.

The memory 705 may store a collection of program or database components, including, for example, a user interface 706, an operating system 707, a web browser 708, etc. In some embodiments, the computer system 700 may store user/application data, such as, for example, the data, variables, records, etc., as described in this disclosure. Such databases may be implemented as, for example, fault-tolerant, relational, scalable, secure databases such as Oracle® or Sybase®.

The operating system 707 may facilitate resource management and operation of the computer system 700. Examples of operating systems include, for example, APPLE MACINTOSH OS X, UNIX, UNIX-like system distributions (e.g., BERKELEY SOFTWARE DISTRIBUTION (BSD), FREEBSD, NETBSD, OPENBSD, etc.), LINUX DISTRIBUTIONS (e.g., RED HAT, UBUNTU, KUBUNTU, etc.), IBM OS/2, MICROSOFT WINDOWS (e.g., XP, VISTA/7/8, 10 etc.), APPLE IOS, GOOGLE ANDROID, BLACKBERRY OS, or the like.

In some embodiments, the computer system 700 may implement the web browser 708 stored program component. The web browser 708 may be a hypertext viewing application such as, for example MICROSOFT INTERNET EXPLORER, GOOGLE CHROME, MOZILLA FIREFOX, APPLE SAFARI, etc. Secure web browsing may be provided using, for example, secure hypertext transport protocol (HTTPS), secure sockets layer (SSL), transport layer security (TLS), etc. Web browsers 708 may utilize facilities such as, for example, AJAX, DHTML, ADOBE FLASH, JAVASCRIPT, JAVA, application programming interfaces (APIs), etc. In some embodiments, the computer system 700 may implement a mail server stored program component. The mail server may be an Internet mail server such as, for example, Microsoft Exchange, or the like. The mail server may utilize facilities such as, for example, ASP, ACTIVEX, ANSI C++/C#, MICROSOFT, .NET, CGI SCRIPTS, JAVA, JAVASCRIPT, PERL, PHP, PYTHON, WEBOBJECTS, etc. The mail server may utilize communication protocols such as, for example, Internet message access protocol (IMAP), messaging application programming interface (MAPI), MICROSOFT exchange, post office protocol (POP), simple mail transfer protocol (SMTP), or the like. In some embodiments, the computer system 700 may implement a mail client stored program component. The mail client may be a mail viewing application, such as, for example, APPLE MAIL, MICROSOFT ENTOURAGE, MICROSOFT OUTLOOK, MOZILLA THUNDERBIRD, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform operations or stages consistent with the embodiments described herein. The term "computer-readable medium" should be understood to include tangible items and exclude carrier waves and transient signals, e.g., is not non-transitory. Examples include random access memory (RAM), read-only memory (ROM), volatile memory, non-volatile memory, hard drives, compact disc read-only memory (CD ROMs), digital video disc (DVDs), flash drives, disks, and any other known physical storage media.

For example, embodiments of the present disclosure may be embodied directly in hardware, in a software module executed by a processor, or in a combination of the two. A software module may be tangibly embodied on a non-transitory program storage device such as, for example, in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an application specific integrated circuit (ASIC). Additionally, the ASIC may reside in a user terminal. Alternatively, the processor and the storage medium may reside as discrete components in a user terminal.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

In embodiments of the present disclosure, the host device transmits a request for reading the data from the data storage device in two parts, when there is a memory constraint in the host device. This ensures that reduced information (e.g., minimal information) used to load the data at the data storage device is transmitted initially to the data storage device. The host device transmits the second part including the buffer information only after the data is ready to be transmitted at the data storage device. This enables the host device to free the buffer until the data is ready to be transmitted at the data storage device. Further, embodiments of the present disclosure enable issuing of the request when limited buffer is available at the host device. Also, as the host device transmits the first part of the request only, the host device can transmit multiple I/O commands sufficient to use the capability of the data storage device.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention may not include the device itself.

The illustrated operations of FIG. 6 show certain events occurring in a certain order. In alternative embodiments, certain operations may be performed in a different order, modified, or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A method of accessing data from a data storage device, the method comprising:
    transmitting, by a host device, a request comprising a first part to the data storage device, based on an availability of memory in the host device,
    wherein the first part comprises data access information and one or more parameters for accessing data corresponding to the request from the data storage device;
    receiving, by the host device, a first notification from the data storage device, indicating a transfer of the data to a storage buffer associated with the data storage device; and
    accessing, by the host device, the data from the data storage device by transmitting a second part of the request to the data storage device, the second part comprising buffer information associated with a host buffer of the host device,
    wherein the data is transferred by the data storage device from the storage buffer to the host buffer of the host device using the buffer information.

2. The method of claim 1, wherein the data access information comprises one or more start logical block address (LBA) indicating a location of the data in the data storage device.

3. The method of claim 1, wherein the one or more parameters comprises at least one of, a number of logic blocks (NLB) of the data, error recovery information, security information, and a type of access to the data storage device.

4. The method of claim 1, wherein the first part of the request further comprises a field indicating inclusion of the buffer information in the second part.

5. The method of claim 1, wherein the second part of the request further comprises a field indicating an identifier associated with the request.

6. The method of claim 1, further comprising:
    transmitting a reset request to the data storage device when the host device is unable to transmit the second part of the request.

7. The method of claim 1, wherein the buffer information comprises one of a list of entries in the host buffer and one or more pointers to the list of entries in a controller associated with the data storage device.

8. The method of claim 1, wherein the storage buffer is one of an internal buffer and a page buffer associated with the data storage device.

9. The method of claim 1, wherein the first part of the request is used to load the data from a physical memory of the data storage device to the storage buffer associated with the data storage device.

10. The method of claim 1, wherein the request is a command comprising a first sub-command used to transmit the first part of the request and a second sub-command used to transmit the second part of the request.

11. A host device for accessing data from a data storage device, the host device comprising:
    one or more processors; and
    a memory storing processor-executable instructions, which, on execution, cause the one or more processors to:
        transmit a request including a first part to the data storage device, based on an availability of memory in the host device,
        wherein the first part comprises data access information and one or more parameters for accessing data corresponding to the request from the data storage device;
        receive a first notification from the data storage device, indicating a transfer of the data to a storage buffer associated with the data storage device; and
        access the data from the data storage device by transmitting a second part of the request to the data storage device, the second part comprising buffer information associated with a host buffer of the host device,
        wherein the data is transferred by the data storage device from the storage buffer to the host buffer of the host device using the buffer information.

12. The host device of claim 11, wherein the data access information comprises one or more start logical block address (LBA) indicating location of the data in the data storage device.

13. The host device of claim 11, wherein the one or more parameters comprises at least one of, a number of logic blocks (NLB) of the data, error recovery information, security information, and a type of access to the data storage device.

14. The host device of claim 11, wherein the first part of the request further comprises a field indicating inclusion of the buffer information in the second part.

15. The host device of claim 11, wherein the second part of the request further comprises a field indicating an identifier associated with the request.

16. The host device of claim 11, wherein the one or more processors are further configured to:

transmit a reset request to the data storage device when the host device is unable to transmit the second part of the request.

17. The host device of claim 11, wherein the buffer information comprises one of a list of entries in the host buffer and one or more pointers to the list of entries in a controller associated with the data storage device.

18. The host device of claim 11, wherein the storage buffer is one of an internal buffer and a page buffer associated with the data storage device.

19. The host device of claim 11, wherein the first part of the request is used to load the data from a physical memory of the data storage device to the storage buffer associated with the data storage device.

20. The host device of claim 11, wherein the request is a command comprising a first sub-command used to transmit the first part of the request and a second sub-command used to transmit the second part of the request.

* * * * *